UNITED STATES PATENT OFFICE.

FRANCIS L. STEWART, OF MURRYSVILLE, PENNSYLVANIA.

IMPROVEMENT IN COMPOUNDS FOR DEFECATING SACCHARINE LIQUIDS.

Specification forming part of Letters Patent No. 202,295, dated April 9, 1878; application filed March 29, 1878.

*To all whom it may concern:*

Be it known that I, FRANCIS L. STEWART, of Murrysville, in the county of Westmoreland and State of Pennsylvania, have invented a new and useful Compound for Defecating Saccharine Liquids, which compound is fully described in the following specification:

This invention relates to that class of compounds used to clarify saccharine liquids in the process of their manufacture into sugars and sirups; and it consists in a composition formed by mixing a solution of tannic acid with liquid sulphurous acid and saturating the mixed acid solution so formed with hydrate of alumina, forming tanno-sulphite of alumina.

To prepare the compound above named, take one hundred grains of dry tannic acid, and dissolve it in one quart of soft water, contained in a porcelain lined or tinned vessel, boil the solution for fifteen minutes over a quick fire, and set it aside to cool. When it has cooled down to a temperature of 60° or 70° Fahrenheit, mix with it three quarts of freshly-prepared liquid sulphurous acid of a specific gravity of 1.035. To the mixed acid solution thus formed add hydrate of alumina, as obtained from any convenient source, but preferably as a precipitate (aluminium trihydrate) obtained by treating a solution of an aluminium salt, such as alum, with an alkali or an alkaline carbonate. When the mixed acid solution has been fully saturated with the hydrate of alumina, and it ceases to dissolve any more of it, it is ready to be used for clarifying crude saccharine juices or impure sugar-solutions.

In the preparation of the compound in any quantity its component parts should be combined in the proportions above indicated.

To clarify saccharine juices or impure solutions of sugar by the use of the solution of tanno-sulphite of alumina, prepared as above described, mix about two quarts of the compound with each one hundred gallons of the saccharine liquid, the density of which should not exceed 12° Beaumé, and at a temperature of about 180° Fahrenheit, heat the liquid rapidly to the boiling-point, shut off the heat, and, after the precipitate has subsided, draw off the clarified liquid from the sediment.

This compound solution, when thus assisted by heat, has the effect of uniting with and rendering insoluble the impurities ordinarily found in saccharine juices or impure sugar-solutions, thus defecating them at once; and the reaction of the different substances in the compound upon the impurities commonly present in the saccharine liquid, and upon each other, is such that, when the liquid is subsequently reduced by rapid boiling to the condition of a dense sirup, it is thus expeditiously and cheaply clarified and refined, no injurious substances being left dissolved in the solution.

This compound, prepared as above described, if inclosed in glass vessels closely sealed, will always be of a perfectly uniform character, ready for immediate use, and it will not decompose by age.

I claim—

A compound for defecating saccharine liquids, consisting of a solution of tannic acid united with liquid sulphurous acid and with hydrate of alumina, substantially as and for the purpose specified.

FRANCIS L. STEWART.

Witnesses:
GEORGE F. DENNISTON,
G. L. HOLLIDAY.